(12) United States Patent
Uehara et al.

(10) Patent No.: US 10,415,753 B2
(45) Date of Patent: Sep. 17, 2019

(54) HIGH-PRESSURE GAS CONTAINER

(71) Applicant: NISSAN MOTOR CO., LTD., Yokohama-shi, Kanagawa (JP)

(72) Inventors: Shigetaka Uehara, Kanagawa (JP); Shinichiro Takemoto, Kanagawa (JP); Hiroshi Uchida, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/576,504

(22) PCT Filed: May 26, 2015

(86) PCT No.: PCT/JP2015/065128
§ 371 (c)(1),
(2) Date: Nov. 22, 2017

(87) PCT Pub. No.: WO2016/189664
PCT Pub. Date: Dec. 1, 2016

(65) Prior Publication Data
US 2018/0172207 A1 Jun. 21, 2018

(51) Int. Cl.
*F17C 1/06* (2006.01)
*F17C 13/00* (2006.01)
*F17C 1/16* (2006.01)

(52) U.S. Cl.
CPC .............. *F17C 1/06* (2013.01); *F17C 13/00* (2013.01); *F17C 1/16* (2013.01); *F17C 2201/0109* (2013.01); *F17C 2201/054* (2013.01); *F17C 2203/014* (2013.01); *F17C 2203/0604* (2013.01); *F17C 2203/067* (2013.01); *F17C 2203/0621* (2013.01); *F17C 2203/0629* (2013.01); *F17C 2203/0682* (2013.01);
(Continued)

(58) Field of Classification Search
CPC ...... F17C 1/06; F17C 1/02; F17C 1/16; F17C 13/002; F17C 2260/037; F17C 2203/014; F17C 2203/0604
USPC .................................................... 220/586
See application file for complete search history.

(56) References Cited

U.S. PATENT DOCUMENTS 7,870,971 B2    1/2011  Schlag
9,205,373 B2 *  12/2015 Leavitt ...................... F17C 1/16
(Continued)

FOREIGN PATENT DOCUMENTS

JP    2008-190699 A    8/2008
JP    2009-174700 A    8/2009
(Continued)

*Primary Examiner* — Robert Poon
(74) *Attorney, Agent, or Firm* — Foley & Lardner LLP (57) ABSTRACT

A high-pressure gas container (100) includes an inner layer (11) configured such that high-pressure gas is filled inside, a boss part (13-1, 13-2) provided at least at one position of the inner layer and configured to cause the gas to flow in and out, and an outer layer (12) configured to cover an outer periphery of the inner layer to reinforce the inner layer and having a higher gas barrier property than the inner layer. A gas discharge port (15-1, 15-2) is provided between the boss part and the outer layer, and a gas ventilation part (14) is formed between the inner layer and the outer layer such that the gas having permeated through the inner layer is discharged into atmosphere through the gas discharge port.

7 Claims, 8 Drawing Sheets

(52) U.S. Cl.
CPC ............ F17C 2205/0305 (2013.01); F17C
2205/0317 (2013.01); F17C 2205/0323
(2013.01); F17C 2209/2109 (2013.01); F17C
2209/2127 (2013.01); F17C 2209/2154
(2013.01); F17C 2209/232 (2013.01); F17C
2209/234 (2013.01); F17C 2221/012
(2013.01); F17C 2223/0123 (2013.01); F17C
2223/036 (2013.01); F17C 2260/037
(2013.01); F17C 2270/0168 (2013.01); F17C
2270/0184 (2013.01); Y02E 60/321 (2013.01)

(56) References Cited

U.S. PATENT DOCUMENTS

| | | | | |
|---|---|---|---|---|
| 2006/0163261 | A1* | 7/2006 | Sugiura | F17C 1/06 220/581 |
| 2009/0200318 | A1* | 8/2009 | Handa | F17C 7/00 220/586 |
| 2011/0233218 | A1 | 9/2011 | Uchimura | |
| 2012/0048865 | A1 | 3/2012 | Eihusen et al. | |
| 2012/0291878 | A1 | 11/2012 | Pisot et al. | |
| 2013/0341235 | A1* | 12/2013 | Leavitt | F17C 1/16 206/524.2 |
| 2014/0061207 | A1* | 3/2014 | Kloft | F15B 1/165 220/586 |
| 2014/0103051 | A1 | 4/2014 | Kanezaki et al. | |
| 2015/0274006 | A1* | 10/2015 | Chung | B29D 22/003 220/586 |
| 2017/0268725 | A1* | 9/2017 | Yeggy | B23P 15/00 |

FOREIGN PATENT DOCUMENTS

| | | |
|---|---|---|
| JP | 2009-243660 A | 10/2009 |
| JP | 2012-127467 A | 7/2012 |
| JP | 2012-180892 A | 9/2012 |
| JP | 2014-081014 A | 5/2014 |
| WO | WO 2010/058452 A1 | 5/2010 |
| WO | WO 2012/074815 A2 | 6/2012 |

* cited by examiner

HIGH-PRESSURE GAS CONTAINER

TECHNICAL FIELD

The present invention relates to a high-pressure gas container with an inner layer configured such that high-pressure gas is filled inside, a boss part provided at least at one position of the inner layer and configured to cause the gas to flow in and out, and a highly permeable outer layer configured to cover the outer periphery of the inner layer to reinforce the inner layer.

BACKGROUND ART

There is known a high-pressure gas container which is for storing gas such as hydrogen in a high-pressure state and formed by winding an outer layer formed of carbon fiber on an inner layer liner formed of resin or the like for reinforcement or the like. A hollow boss part configured to cause the gas to flow in and out is formed on one end or each of both ends of this high-pressure gas container.

In the high-pressure gas container thus configured, the stored gas may permeate through the inner layer liner according to permeation ability determined by factors such as the size of molecules of stored gas components. The gas having permeated through the inner layer liner in this way is blocked by the outer layer having a higher gas barrier property than the inner layer liner, thereby remaining between the inner layer liner and the outer layer.

If the gas continues to remain between the inner layer liner and the outer layer in this way, the inner layer liner may be compressed and deformed by a pressure of the remaining gas.

To prevent such a situation, JP2008-190699A discloses a fuel gas tank in which a plurality of openings penetrating in a thickness direction are formed in a reinforcing layer (outer layer) having a lower gas permeability than a resin layer serving as an inner layer. According to this fuel gas tank, gas remaining between the resin layer and the reinforcing layer is discharged to outside through the plurality of openings.

SUMMARY OF INVENTION

In the case of JP2008-190699A, since the openings for discharging the remaining gas are provided over the entire reinforcing layer serving as the outer layer, there is a problem of reducing the strength of the reinforcing layer. Particularly, if the reinforcing layer is formed by impregnating a fiber material such as carbon fiber with resin, delamination between the fiber material and the resin may be induced by providing the above openings and a strength reduction of the reinforcing layer is further concerned.

To solve such a conventional problem, the present invention aims to provide a high-pressure gas container capable of discharging gas permeating through an inner layer to outside without causing a strength reduction of an outer layer.

According to one aspect of the present invention, a high-pressure gas container including an inner layer and an outer layer having a lower permeability than the inner layer. A boss part is provided at least at one position of the inner layer. In the high-pressure gas container, a gas ventilation part is formed between the inner layer and the outer layer and a gas discharge port is formed between the boss part and the outer layer.

DESCRIPTION OF EMBODIMENTS

Hereinafter, embodiments of the present invention are described with reference to the accompanying drawings.

First Embodiment

Figure 1:
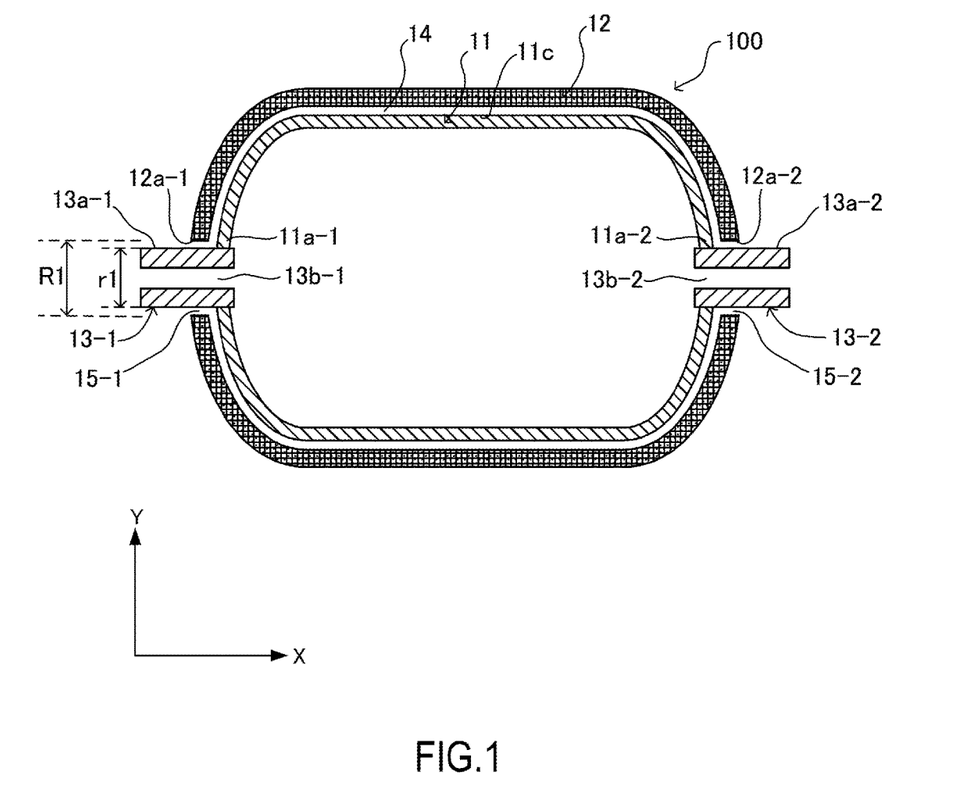
FIG. 1 is a diagram showing the configuration of a high-pressure gas container according to a first embodiment of the present invention.

FIG. 1 is a schematic vertical sectional view showing a high-pressure gas container according to a first embodiment of the present invention. Gas is stored in a high-pressure state of 35 Mpa or 70 Mpa inside this high-pressure gas container 100. Various types of gases can be supposed for this gas. In the present embodiment, hydrogen gas is particularly supposed and the high-pressure gas container 100 storing this hydrogen gas is installed, for example, in a fuel cell vehicle.

The high-pressure gas container 100 of the present embodiment includes an inner layer liner 11 serving as an inner layer configured such that high-pressure gas is filled inside and an outer layer 12 having a lower permeability than the inner layer liner 11. Boss parts 13-1, 13-2 are respectively formed on both end parts 11*a*-1, 11*a*-2 of the inner layer liner 11 in a longitudinal direction (direction along an X axis of FIG. 1). Further, a gas ventilation part 14 for ventilating the gas permeating through the inner layer liner 11 is formed between the inner layer liner 11 and the outer layer 12. Particularly, in the present embodiment, gas discharge ports 15-1, 15-2 communicating with the gas ventilation part 14 are formed between the boss parts 13-1, 13-2 and the outer layer 12.

The inner layer liner 11 is formed of a material having a relatively high gas barrier property such as polyethylene resin or polypropylene resin and has a substantially cylindrical shape. Further, outer peripheral surfaces 13*a*-1, 13*a*-2 (also rewritten as boss outer peripheral surfaces 13*a*-1, 13*a*-2 below) of the boss parts 13-1, 13-2 are respectively connected to the both end parts 11*a*-1, 11*a*-2 of the inner layer liner 11. It should be noted that the inner layer liner 11 and the boss parts 13-1, 13-2 are connected, for example, by setting the boss parts 13-1, 13-2 in a mold for molding the inner layer liner 11 in advance and performing blow molding or the like.

Particularly, in the present embodiment, the both end parts 11a-1, 11a-2 of the inner layer liner 11 are formed to extend toward connected parts to the boss parts 13-1, 13-2. Thus, the both end parts 11a-1, 11a-2 of the inner layer liner 11 are substantially perpendicular to the boss outer peripheral surfaces 13a-1, 13a-2.

The outer layer 12 mainly functions to reinforce the inner layer liner 11 and is constituted of carbon fiber reinforced plastic (CFRP) formed by impregnating a carbon fiber material with resin such as epoxy resin. Particularly, the outer layer 12 is formed by winding a strip-like carbon fiber material impregnated with resin on an outer peripheral surface 11c (hereinafter, also written as the inner layer outer peripheral surface 11c) of the inner layer liner 11 utilizing a filament winding method. It should be noted that in the present embodiment so-called helical winding having a relatively large winding angle of the carbon fiber material is used as an example of this winding. The outer layer 12 thus configured has a lower permeability than the inner layer liner 11. Specifically, the outer layer 12 has a higher gas barrier property than the inner layer liner 11.

On the other hand, in the present embodiment, the gas ventilation part 14 is configured as a cavity formed between the inner layer liner 11 and the outer layer 12. Note that, in configuring such a cavity-shaped gas ventilation part 14, for example, several spacers are arranged on the outer peripheral surface of the inner layer liner 11 and the carbon fiber material constituting the outer layer 12 is wound on the inner layer liner 11 having these spacers arranged thereon.

In this way, the spacers can hold the cavity serving as the gas ventilation part 14 between the inner layer liner 11 and the outer layer 12. Particularly, the number and size of the spacers arranged on the outer peripheral surface of the inner layer liner 11 are preferably adjusted so that the tension of the carbon fiber material wound to configure the outer layer 12 can be maintained.

Further, the outer layer 12 is formed with open parts 12a-1, 12a-2 on both end parts in a longitudinal direction (direction along the X axis of FIG. 1) thereof. A diameter R1 of the open parts 12a-1, 12a-2 is larger than an outer diameter r1 of the boss parts 13-1, 13-2.

The boss parts 13-1, 13-2 having the relatively small outer diameter r1 are inserted into the open parts 12a-1, 12a-2 having the relatively large diameter R1 with axial centers thereof aligned. In this way, spaces are formed between the boss outer peripheral surfaces 13a-1, 13a-2 and edge parts of the open parts 12a-1, 12a-2.

These spaces are in contact with and communicate with the gas ventilation part 14 as is clear from FIG. 1. Thus, in the present embodiment, these clearances between the boss parts 13a-1, 13a-2 and the outer layer 12 are configured as the gas discharge ports 15-1, 15-2. It should be noted that this gas discharge port 15-1, 15-2 has a substantially circular ring shape defined by the boss outer peripheral surface 13a-1, 13a-2 and the edge part of the open part 12a-1, 12a-2 in a front view of the container, i.e. when the high-pressure gas container 100 is viewed along an X-axis direction of FIG. 1.

It should be noted that the open parts 12a-1, 12a-2 may be configured by processing after the resin-impregnated carbon fiber material constituting the outer layer 12 is wound. However, it is preferable to form the open parts 12a-1, 12a-2 by winding the resin-impregnated carbon fiber material in such a manner as to be separated from the boss parts 13-1, 13-2 in advance. This eliminates the need for processing the outer layer 12 to form the open parts 12a-1, 12a-2.

Further, as is understood from FIG. 1, both end parts of the outer layer 12 are also substantially perpendicular to the boss outer peripheral surfaces 13a-1, 13a-2 similarly to the both end parts 11a-1, 11a-2 of the inner layer liner 11.

On the other hand, the boss parts 13-1, 13-2 are hollow cylindrical members having hole parts 13b-1, 13b-2 formed along the axial centers thereof. The boss parts 13-1, 13-2 are, for example, formed of a metal material such as stainless steel or aluminum.

It should be noted that the hole parts 13b-1, 13b-2 are formed and open in the both boss parts 13-1, 13-2 in FIG. 1. However, the form of the boss parts 13-1, 13-2, particularly of the hole parts 13b-1, 13b-2 is not particularly limited to this.

For example, in a state where the high-pressure gas container 100 is actually used, the hole part 13b-1 of one boss part 13-1 may be closed by a predetermined lid member and a main stop valve or a fusible plug valve may be provided in the hole part 13b-2 of the other boss part 13-2. In this case, only the other boss part 13-2 functions as a gas inflow/outflow port while the one boss part 13-1 is closed to enhance airtightness in the container. Further, there is no limitation to the boss parts 13-1, 13-2 provided on the both ends of the inner layer liner 11. For example, a boss part may be provided only on one end of the inner layer liner 11 or boss part(s) may be provided in part(s) of the inner layer liner 11 other than the end parts.

According to the high-pressure gas container 100 of the present embodiment described above, the following effects can be obtained.

The high-pressure gas container 100 of the present embodiment includes the inner layer liner 11 serving as the inner layer configured such that the high-pressure gas is filled inside, the boss parts 13-1, 13-2 provided on the both ends of the inner layer liner 11 and configured to cause the gas to flow in and out, and the outer layer 12 configured to cover the outer peripheral surface 11c of the inner layer liner 11 to reinforce the inner layer liner 11 and having a higher permeability than the inner layer liner 11. Further, in the high-pressure gas container 100 of the present embodiment, the gas discharge ports 15-1, 15-2 are provided between the boss parts 13-1, 13-2 and the outer layer 12 and the gas ventilation part 14 is formed between the inner layer liner 11 and the outer layer 12 such that the gas having permeated from the inner layer liner 11 to the outer layer 12 is discharged into atmosphere through the gas discharge ports 15-1, 15-2.

Accordingly, in the high-pressure gas container 100 of the present embodiment, the gas permeating through the inner layer liner 11 is guided to the inner layer liner 11 and the outer layer 12 without permeating through the outer layer 12 having a high gas barrier property and moves toward the boss part 13-1 or 13-2 in the gas ventilation part 14. The gas moving in the gas ventilation part 14 in this way is discharged to outside from the gas discharge port 15-1 (or gas discharge port 15-2) provided between the boss part 13-1, 13-2 and the outer layer 12.

In this way, the gas can be suitably discharged to outside without remaining in the gas ventilation part 14 in the high-pressure gas container 100 of the present embodiment. Particularly, processing causing a strength reduction of the outer layer 12 such as the provision of a plurality of openings for discharging the gas over the entire outer layer 12 as before is not necessary in the present embodiment.

Thus, the gas permeating through the inner layer liner 11 can be discharged to outside without reducing the strength of the outer layer 12.

Further, in the high-pressure gas container 100 of the present embodiment, the outer layer 12 is preferably configured by winding the fiber material (resin-impregnated carbon fiber material) constituting the outer layer 12 such that the open parts 12a-1, 12a-2 having the diameter R1 larger than the outer diameter r1 of the boss parts 13-1, 13-2 are formed on the both end parts of the outer layer 12.

In this way, the gas discharge ports 15-1, 15-2 for discharging the gas to outside can be realized by an easy process of winding the fiber material such that the open parts 12a-1, 12a-2 are formed on the both end parts of the outer layer 12 without performing special processing.

In other words, the open parts 12a-1, 12a-2 are formed only by preventing the fiber material constituting the outer layer 12 from being wound in areas around the boss parts 13-1, 13-2, with the result that the gas discharge ports 15-1, 15-2 defined by the open parts 12a-1, 12a-2 and the boss parts 13-1, 13-2 are also easily formed.

Further, in the present embodiment, the both end parts 11a-1, 11a-2 of the inner layer liner 11 and the boss outer peripheral surfaces 13a-1, 13a-2 are substantially perpendicular, and the both end parts of the outer layer 12 and the boss outer peripheral surfaces 13a-1, 13a-2 are also substantially perpendicular.

Accordingly, the gas in the gas ventilation part 14 moves toward the boss parts 13-1, 13-2 in the gas ventilation part 14, is guided in an extending direction of the boss outer peripheral surfaces 13a-1, 13a-2 (direction along the X axis of FIG. 1) by the boss outer peripheral surfaces 13a-1, 13a-2 and discharged from the gas discharge ports 15-1, 15-2. In this way, the gas in the gas ventilation part 14 can be effectively discharged to outside.

Second Embodiment

A second embodiment is described below. It should be noted that, in each of the following embodiments, the same elements as those described in the previous embodiment are denoted by the same reference signs and not described.

Figure 2A:
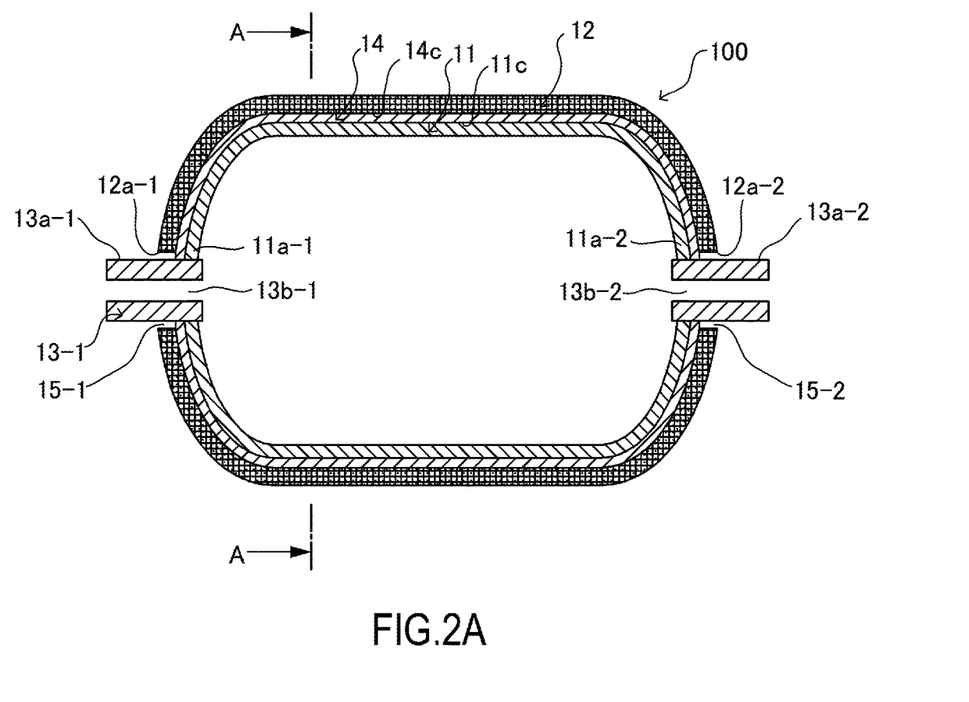
FIG. 2A is a diagram showing the configuration of a high-pressure gas container according to a second embodiment of the present invention.
Figure 2B:
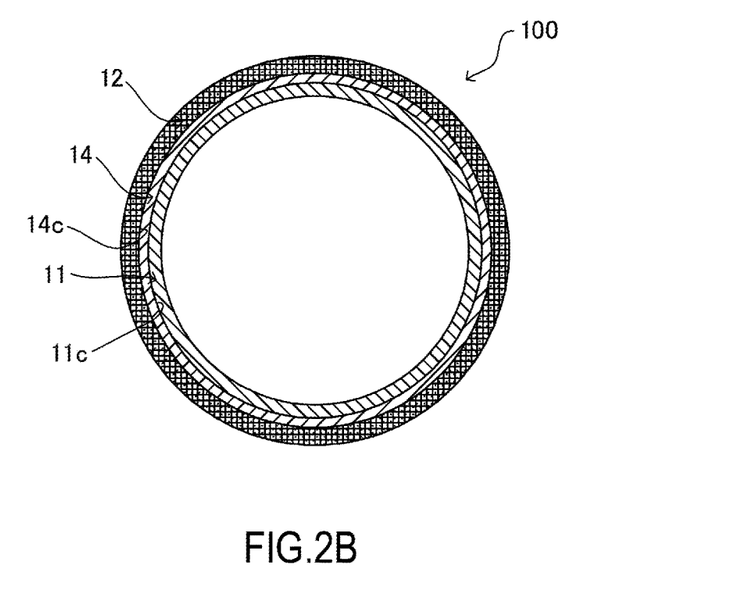
FIG. 2B is a sectional view of the high-pressure gas container along line A-A of FIG. 2A.

FIG. 2A is a schematic vertical sectional view of a high-pressure gas container 100 according to the present embodiment, and FIG. 2B is a sectional view along line A-A in FIG. 2A. In the present embodiment, a gas ventilation part 14 is particularly configured as a layer of a porous resin material serving as a porous body.

Materials such as porous polyethylene and porous polyurethane formed with a plurality of hole parts having a radius of, for example, about several μm to several mm can be used as the porous resin material. Specifically, with these materials, a ventilation function necessary as the gas ventilation part 14 is ensured by the plurality of hole parts.

Further, boss outer peripheral surfaces 13a-1, 13a-2 are connected to both end parts of the gas ventilation part 14. Thus, the gas ventilation part 14 entirely covers an inner layer outer peripheral surface 11c.

In the present embodiment, an outer layer 12 is formed by winding a carbon fiber material constituting the outer layer 12 on an outer peripheral surface 14c of the gas ventilation part 14 entirely covering the inner layer outer peripheral surface 11c in this way.

According to the high-pressure gas container 100 of the present embodiment described above, the following effects can be obtained.

In the high-pressure gas container 100 of the present embodiment, the gas ventilation part 14 is constituted of the porous material serving as the porous body. In this way, the tension (winding force) of the fiber material (constituting the outer layer 12) wound on this gas ventilation part 14 serving as the porous body can be supported by the gas ventilation part 14 while gas permeability in the gas ventilation part 14 is ensured. Specifically, a loss of tension of the outer layer 12 is prevented.

Third Embodiment

A third embodiment is described below.

Figure 3:
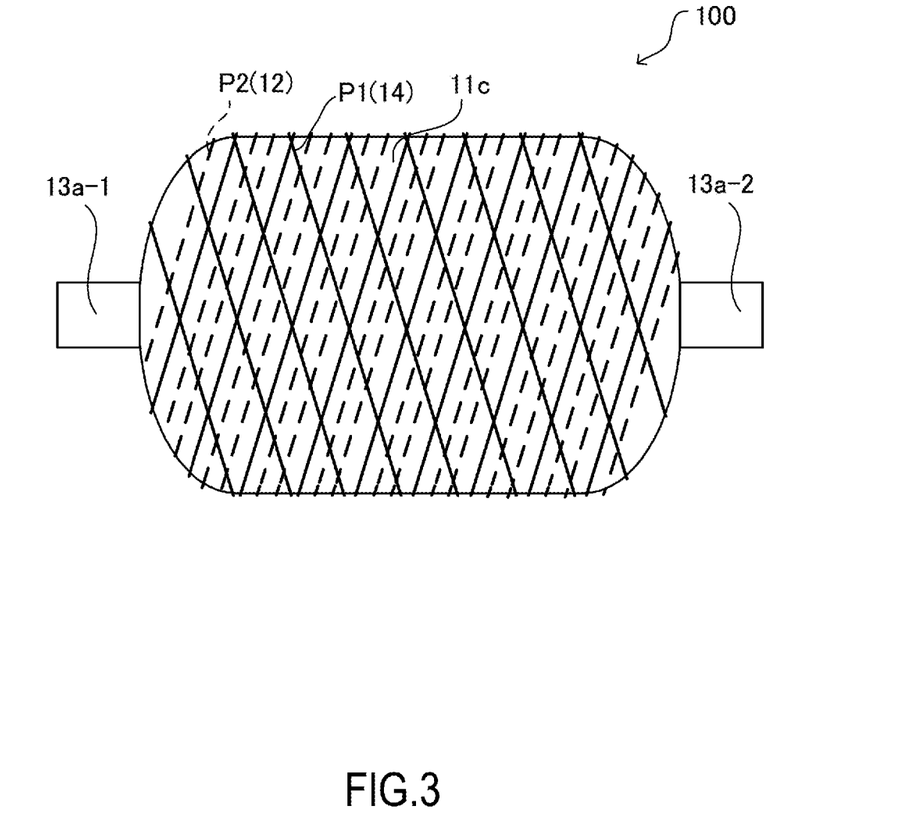
FIG. 3 is a diagram showing a state where a gas ventilation part is provided in an inner layer liner in a third embodiment of the present invention.

FIG. 3 is a diagram showing a state where a gas ventilation part is provided in an inner layer liner in the present embodiment.

In the present embodiment, a gas ventilation part 14 serving as a porous body is formed by winding a carbon fiber material P1 on an inner layer outer peripheral surface 11c at a winding density lower than that of a carbon fiber material P2 constituting an outer layer 12. It should be noted that the "winding density" means the number of windings of the fiber material wound per unit surface area in a winding target such as the inner layer outer peripheral surface 11c.

The same material as the carbon fiber material P2 constituting the outer layer 12 is used as the carbon fiber material P1 constituting the gas ventilation part 14. As shown in FIG. 3, the carbon fiber material P1 is wound at the winding density lower than the carbon fiber material P2 constituting the outer layer 12. It should be noted that, in FIG. 3, a state of winding the carbon fiber material P2 constituting the outer layer 12 is schematically shown by broken lines for reference.

Figure 4:
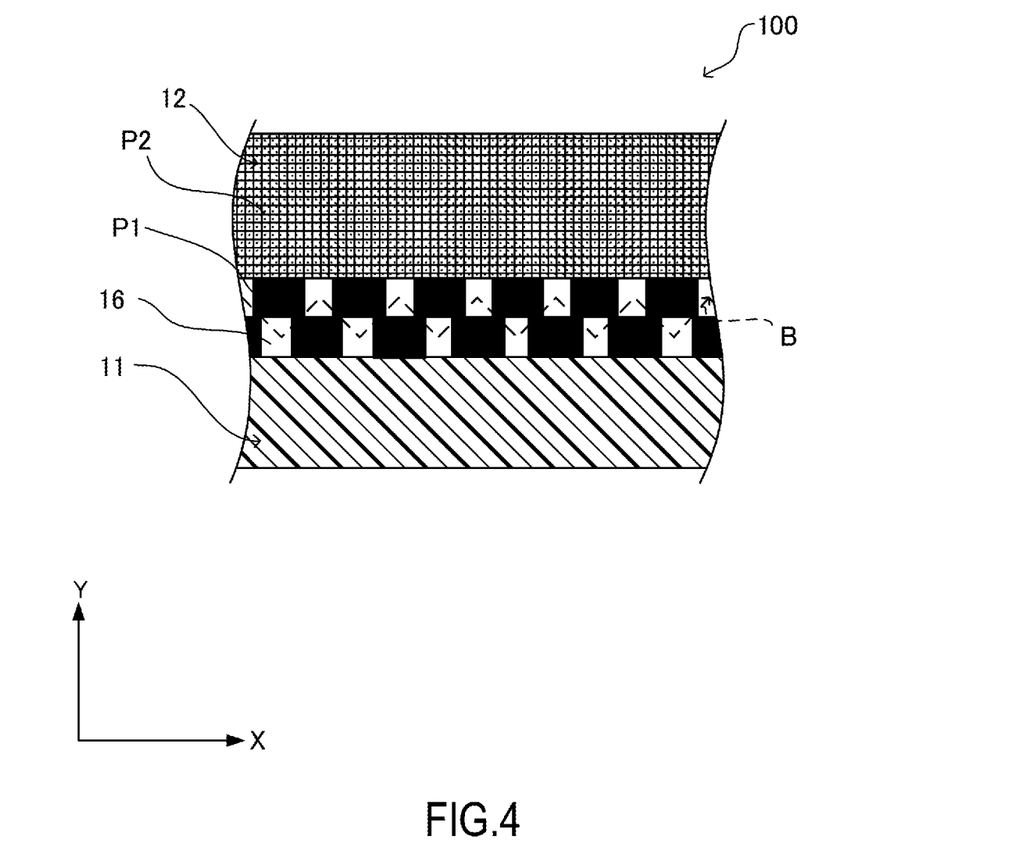
FIG. 4 is a diagram showing the configuration of a high-pressure gas container according to the third embodiment of the present invention.

On the other hand, FIG. 4 is a schematic vertical section of an essential part of a high-pressure gas container 100 of the present embodiment. As is understood from FIG. 4, clearances 16 are formed between parts of the carbon fiber material P1 wound at the relatively low winding density as described above.

In FIG. 4, the carbon fiber material P1 is wound to overlap in two stages in a container radial direction (Y-axis direction) and slightly offset in the positions of the carbon fiber material P1 in the upper stage and the carbon fiber material P1 in the lower stage in a container axial direction (X-axis direction). In this way, the clearances 16 are formed between parts of the carbon fiber material P1 adjacent to each other in both upper and lower stages. It should be noted that the number and size of these clearances 16 can be arbitrarily set such as by adjusting the winding density of the carbon fiber material P1.

Accordingly, gas permeated into the gas ventilation part 14 through an inner layer liner 11 moves to a gas discharge port 15-1 or 15-2 and is discharged to outside with the aforementioned clearances 16 formed between the parts of the carbon fiber material P1 serving as a path (see a bent arrow B of FIG. 4).

On the other hand, the outer layer 12 of the present embodiment is wound on the inner layer liner 11 from above the roughly wound carbon fiber material P1. It should be noted that since the outer layer 12 is required to have a high gas barrier property, the winding density of the carbon fiber material P2 in the outer layer 12 is higher than that of the carbon fiber material P1 of the gas ventilation part 14 as described above.

According to the high-pressure gas container 100 of the present embodiment described above, the following effects can be obtained.

In the high-pressure gas container 100 of the present embodiment, the gas ventilation part 14 serving as the porous body is formed by winding the fiber material P on the inner layer liner 11 at the winding density lower than the winding density of the fiber material constituting the outer layer 12. Particularly, the gas ventilation part 14 is formed by winding the fiber material P1 on the inner layer liner 11 such that a number of the clearances 16 of a size to ensure the gas permeability of the gas ventilation part 14 are formed.

In this way, the gas ventilation part 14 serving as the porous body can be configured by a simple method of relatively roughly winding the fiber material P1 without using a cumbersome manufacturing process or an expensive material.

Particularly, in the present embodiment, the same carbon fiber material as the fiber material P2 constituting the outer layer 12 is used as the fiber material P1 constituting the gas ventilation part 14. Thus, a process for configuring the gas ventilation part 14 and a process for configuring the outer layer 12 follow the same steps except the number of windings of the fiber material.

Accordingly, a transition can be made from a step of winding the fiber material P1 to configure the gas ventilation part 14 to a step of winding the fiber material P2 to configure the outer layer 12 as one of a series of steps. Thus, a manufacturing process of the entire high-pressure gas container 100 configured with the gas ventilation part 14 is more simplified.

Fourth Embodiment

A fourth embodiment is described below.

Figure 5:
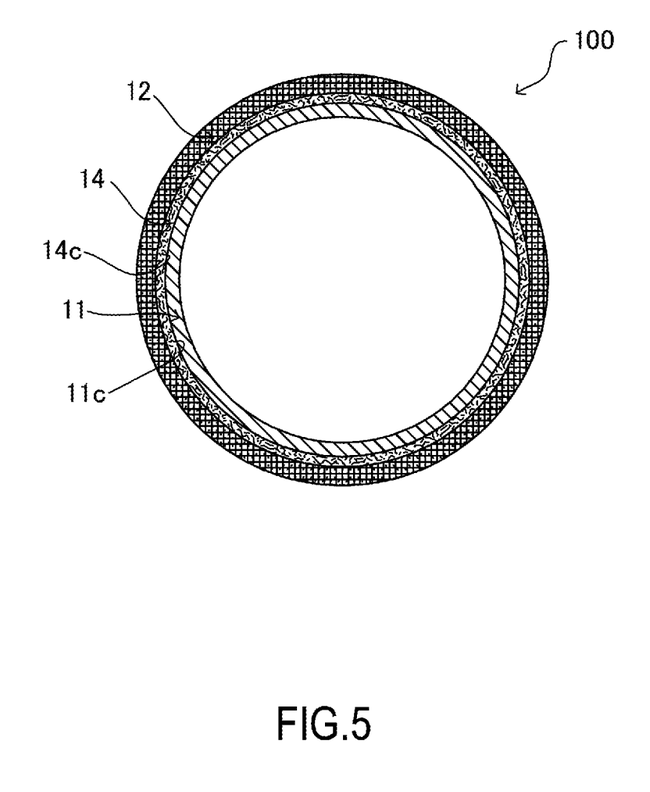
FIG. 5 is a diagram showing the configuration of a high-pressure gas container according to a fourth embodiment of the present invention.

FIG. 5 is a schematic configuration diagram of a high-pressure gas container according to the fourth embodiment of the present invention, particularly a schematic vertical sectional view of an essential part of a high-pressure gas container 100 of the present embodiment.

As shown, in the present embodiment, a gas ventilation part 14 serving as a porous body is constituted of a hollow fiber membrane. Here, the hollow fiber membrane is a polymer membrane constituted of a pipe-like member having a plurality of fine hole parts (e.g. having a diameter of 1 μm or shorter) formed in a side wall.

In the present embodiment, as shown, the gas ventilation part 14 formed of the hollow fiber membrane entirely covers an inner layer outer peripheral surface 11c as in the second embodiment. Further, an outer layer 12 is formed by being wound on an outer peripheral surface 14c of the gas ventilation part 14 formed of the hollow fiber membrane entirely covering the inner layer outer peripheral surface 11c in this way.

According to the high-pressure gas container 100 of the present embodiment described above, the following effects can be obtained.

In the high-pressure gas container 100 of the present embodiment, the gas ventilation part 14 serving as the porous body is constituted of the hollow fiber membrane. In this way, the interior of the hollow fiber membrane and the fine hole parts formed in the side wall of the hollow fiber membrane can serve as paths for allowing gas permeating through the inner layer liner 11 to move to a gas discharge port 15-1 or 15-2. Specifically, a gas ventilation function in the gas ventilation part 14 can be more reliably exhibited.

Particularly, the hollow fiber membrane can be applied to the inner layer liner 11 by being wound using a predetermined winding device or the like. Thus, such a hollow fiber membrane can be wound using a facility and a method for winding a carbon fiber material constituting the outer layer 12 or similar facility and method.

In this way, a transition can be made from a step of winding the hollow fiber membrane constituting the gas ventilation part 14 to a step of winding the outer layer 12 as one of a series of steps. Thus, a manufacturing process of the entire high-pressure gas container 100 configured with the gas ventilation part 14 is more simplified.

Fifth Embodiment

A fifth embodiment is described below.

Figure 6:
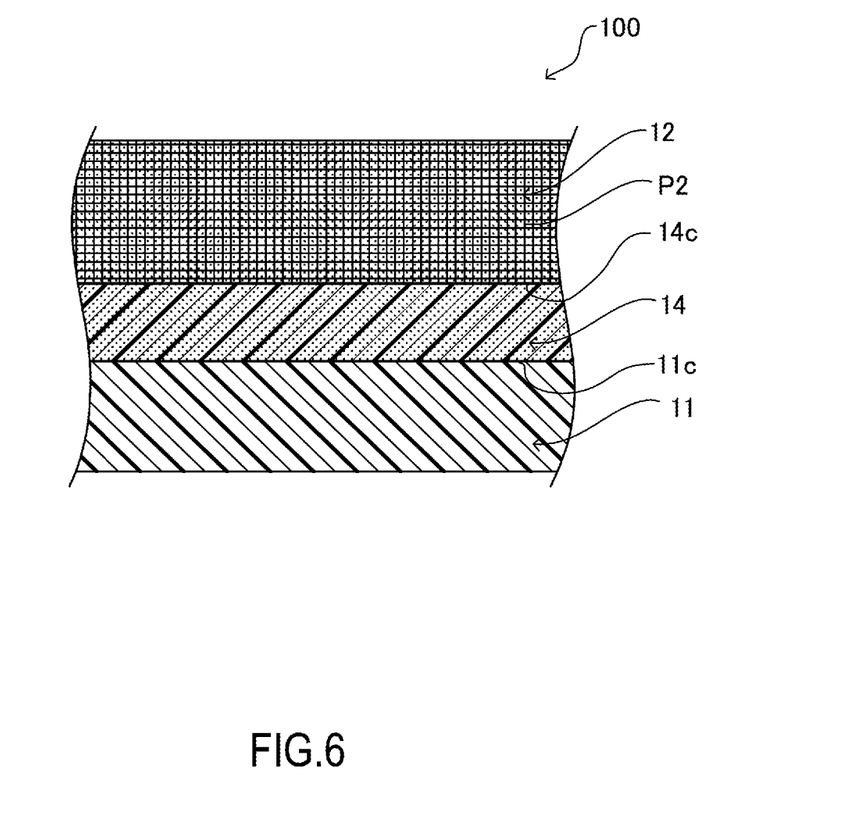
FIG. 6 is a diagram showing the configuration of a high-pressure gas container according to a fifth embodiment of the present invention.

FIG. 6 is a schematic configuration diagram of a high-pressure gas container 100 according to the fifth embodiment of the present invention, particularly a schematic vertical sectional view of an essential part of the high-pressure gas container 100 of the present embodiment.

In the high-pressure gas container 100 of the present embodiment, a gas ventilation part 14 serving as a porous body is constituted of a water-repellent resin material. Specifically, the gas ventilation part 14 constituted of the water-repellent resin material entirely covers an inner layer outer peripheral surface 11c as in the second embodiment. Further, an outer layer 12 is formed by winding a carbon fiber P2 impregnated with resin on an outer peripheral surface 14c of the gas ventilation part 14 entirely covering the inner layer outer peripheral surface 11c in this way.

The water-repellent resin material in the present embodiment is, for example, a material formed by compounding an e-PTFE film formed by drawing polytetrafluoroethylene (PTFE) and polyurethane polymer. This material has, for example, about $1.4 \times 10^8$ fine hole parts (e.g. having a diameter of less than 1 μm) per $cm^2$.

The above hole parts are formed to have a diameter capable of blocking the passage of resin components and water of liquid while allowing the passage of hydrogen supposed as gas in the present embodiment. An example of such a material is Goretex (registered trademark).

In this way, in the gas ventilation part 14, a water repellent function of blocking liquid such as moisture is realized while a function of causing the gas having permeated through the inner layer liner 11 to pass and move to a gas discharge port 15-1 or 15-2 is ensured. Specifically, the gas ventilation part 14 is configured to prevent the permeation of liquid while allowing the permeation of the gas.

According to the high-pressure gas container 100 of the present embodiment described above, the following effects can be obtained.

In the high-pressure gas container 100 of the present embodiment, the gas ventilation part 14 is constituted of the water-repellent material. In this way, it is possible to prevent the penetration of, for example, the resin impregnated in the outer layer 12 or moisture produced by dew condensation or the like into the gas ventilation part 14 while ensuring a ventilation function in the gas ventilation part 14.

Particularly, since the water-repellent material according to the present embodiment is a material formed with a plurality of fine hole parts having such a diameter as to block the liquid while allowing the passage of the gas, the penetration of the resin and moisture described above is blocked and the clogging of the hole parts is prevented. By preventing the clogging of the hole parts in this way, an original function of the gas ventilation part 14 to allow the passage of the gas can be reliably exhibited without being impaired.

Particularly, since the outer layer 12 is formed by winding the carbon fiber P2 impregnated with resin on the gas ventilation part 14 in the present embodiment, it is supposed that tension is applied to the resin-impregnated carbon fiber and the liquid resin impregnated therein is squeezed toward the gas ventilation part 14 during a winding operation.

However, even if the liquid resin moves toward the gas ventilation part 14 as just described, the liquid resin is suitably blocked by a part of the outer peripheral surface 14c of the gas ventilation part 14 by the action of the above water-repellent material.

Further, in the case of installing the high-pressure gas container 100 according to the present embodiment in a fuel cell vehicle, a phenomenon so-called splashing in which moisture splashed during travel reaches the high-pressure gas container 100 may occur when this vehicle travels such as in rainy weather.

Accordingly, in the case of installing the high-pressure gas container 100 in the fuel cell vehicle, there is, particularly, a higher requirement to prevent the penetration of moisture into the gas ventilation part 14. As a result, the configuration according to the present embodiment described above and the functions and effects thereof are particularly effective in the case of installing the high-pressure gas container 100 in the fuel cell vehicle.

It should be noted that the water-repellent material according to the present embodiment is illustrative and other arbitrary materials having a similar water repellent function can be used besides this water-repellent material.

Sixth Embodiment

A sixth embodiment is described below.

Figure 7:
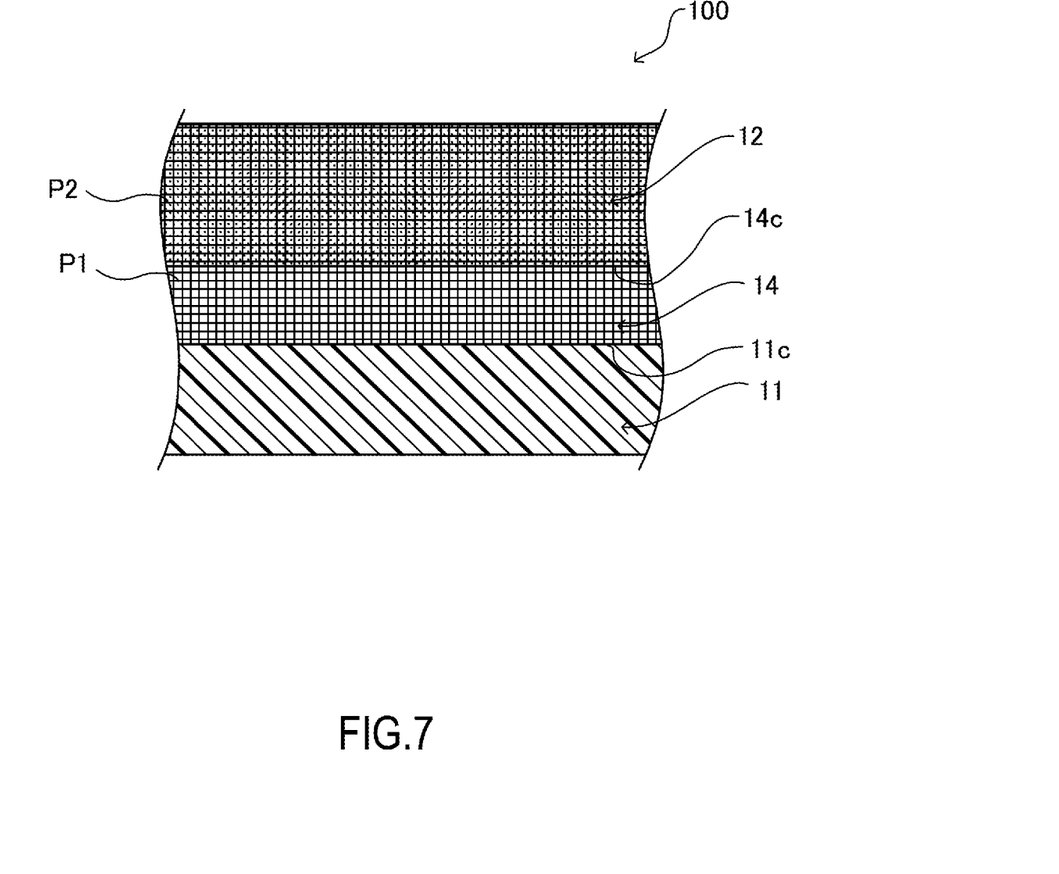
FIG. 7 is a diagram showing the configuration of a high-pressure gas container according to a sixth embodiment of the present invention.

FIG. 7 is a schematic configuration diagram of a high-pressure gas container 100 according to the sixth embodiment of the present invention, particularly a schematic vertical sectional view of an essential part of the high-pressure gas container 100 of the present embodiment.

In the high-pressure gas container 100 of the present embodiment, a gas ventilation part 14 between an inner layer liner 11 and an outer layer 12 is constituted of a fiber material P1 not impregnated with resin.

Specifically, the fiber material P1 constituting the gas ventilation part 14 is the same type of carbon fiber material as a fiber material P2 constituting the outer layer 12. However, the fiber material P1 constituting the gas ventilation part 14 is not impregnated with liquid resin such as epoxy resin unlike the outer layer 12. Specifically, in the present embodiment, the gas ventilation part 14 is configured by winding the fiber material P1 not impregnated with resin on the inner layer liner 11.

The gas ventilation part 14 configured by winding the fiber material P1 not impregnated with resin in this way has a lower airtightness than the outer layer 12 configured by winding the fiber material P2 impregnated with resin. Specifically, the gas ventilation part 14 has a higher ventilation performance than the outer layer 12.

According to the high-pressure gas container 100 of the present embodiment described above, the following effects can be obtained.

In the high-pressure gas container 100 of the present embodiment, the outer layer 12 is formed of the fiber material P2 impregnated with resin and the gas ventilation part 14 is formed of the fiber material P1 not impregnated with resin. In this way, a ventilation function of the gas ventilation part 14 can be ensured by an easy method of using the fiber material P1 not impregnated with resin without using a cumbersome manufacturing process or an expensive material.

Particularly, in the present embodiment, the outer layer 12 and the gas ventilation part 14 are constituted of the same type of carbon fiber materials although these materials differ in resin impregnation. Thus, it is sufficient to perform the same manufacturing process (winding operation) in configuring the outer layer 12 and the gas ventilation part 14, wherefore a manufacturing process is simplified.

Further, as described above, the permeability of the gas ventilation part 14 is ensured in the present embodiment since the fiber material P1 constituting the gas ventilation part 14 is not impregnated with resin. However, a winding density of the fiber material P1 is preferably adjusted to be not too high in terms of ensuring a certain level of ventilation performance of the gas ventilation part 14 or higher.

Particularly, the winding density of the fiber material P1 constituting the gas ventilation part 14 is preferably lower than that of the fiber material P2 constituting the outer layer 12 as in the third embodiment. Coupled with the fact that the fiber material P constituting the gas ventilation part 14 is not impregnated with resin, this can more satisfactorily ensure the ventilation performance of the gas ventilation part 14.

On the other hand, since the permeability of the gas ventilation part 14 is ensured by not impregnating the fiber material P1 with resin as described above in the present embodiment, it is also possible to set a certain high winding density. A function of supporting the tension of the outer layer 12 may be further enhanced by setting a certain high winding density of the fiber material P1 to maximally prevent the formation of clearances between the inner layer liner 11 and the outer layer 12.

Seventh Embodiment

A seventh embodiment is described below.

Figure 8A:
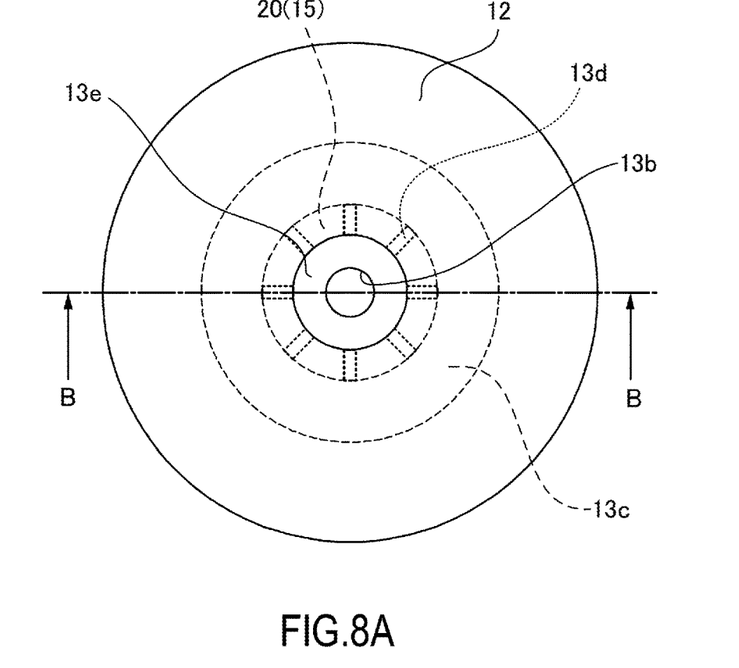
FIG. 8A is a diagram showing the configuration of a high-pressure gas container according to a seventh embodiment of the present invention.
Figure 8B:
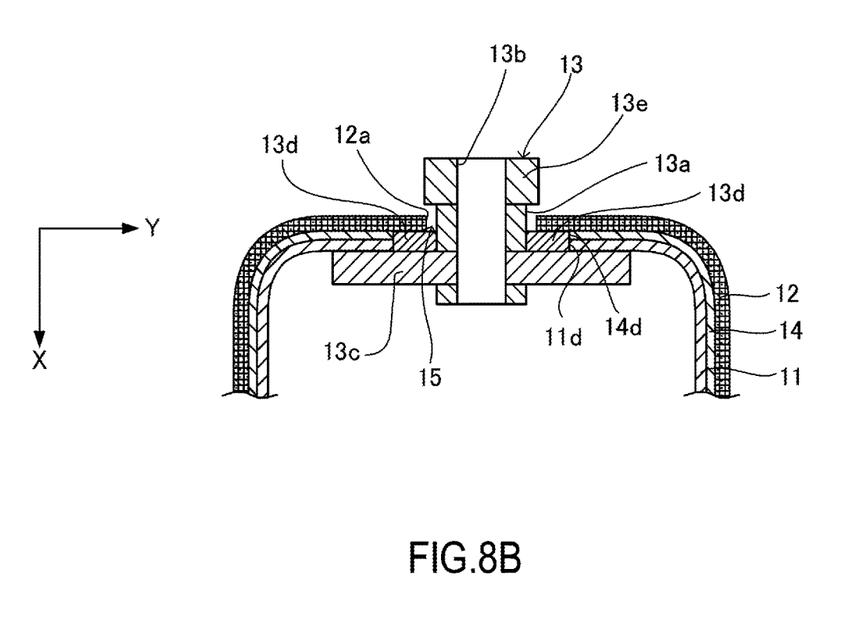
FIG. 8B is a sectional view of the high-pressure gas container along line B-B of FIG. 8A.

FIG. 8A is a schematic plan view of a high-pressure gas container 100 according to the seventh embodiment of the present invention, and FIG. 8B is a schematic vertical sectional view along line B-B of FIG. 8A near one boss part 13 of the high-pressure gas container 100. It should be noted that, in the present embodiment, hyphenated signs such as "boss parts 13-1, 13-2" used in the first to sixth embodiments are omitted and signs are unified into those such as "boss parts 13" without distinguishing the components.

As shown, in the present embodiment, a basic configuration of a container body composed of an inner layer liner 11, an outer layer 12 and a gas ventilation part 14 is similar to that of the high-pressure gas container 100 according to the second embodiment described above.

In the present embodiment, the boss part 13 includes an annular part 13c on a base end side part thereof, and a plurality of (eight in FIG. 8A) radially arranged rib parts 13d are provided in a circumferential direction of the boss part 13 on the upper surface of this annular part 13c.

An end part 11d of the inner layer liner 11 on the side of the boss part 13 and an end part 14d of the gas ventilation part 14 on the side of the boss part 13 are in contact with tip parts of the rib parts 13d. Further, the outer layer 12 is formed to cover partial areas, i.e. about ¾ areas in the present embodiment, of the upper surfaces of the rib parts 13d.

This causes a clearance to be formed between an edge part of an open part 12a of the outer layer 12 (end surface of the outer layer 12) and a boss outer peripheral surface 13a. Further, this clearance communicates with spaces 20 between the plurality of arranged rib parts 13d.

Thus, gas permeating through the inner layer liner 11 and moving to the boss part 13 through the gas ventilation part 14 is introduced into the spaces 20 between the plurality of arranged rib parts 13d, move into the above clearance communicating with these spaces 20 and is finally discharged to the outside of the container. Specifically, a gas discharge port 15 is formed by the above clearance and the spaces 20.

It should be noted that a ratio of the outer layer 12 covering an upper surface area of the rib part 13d can be arbitrarily adjusted as long as the open part 12a is ensured. For example, the ratio of the outer layer 12 covering the upper surface area of the rib part 13d can be set at 0 to 95% to the entire upper surface area. Particularly, this ratio preferably exceeds 50%.

Further, a relatively thick part 13e is formed on a tip side part of the boss part 13. This causes a gas passage area to be narrowed by being surrounded by an edge part of the open part 12a of the outer layer 12, the boss outer peripheral surface 13a and the thick part 13e. In this way, the discharge of the gas from the gas discharge part 15 is promoted by a so-called venturi effect.

According to the high-pressure gas container 100 of the present embodiment described above, the following effects can be obtained.

In the high-pressure gas container 100 of the present embodiment, the boss part 13 is formed with the rib parts 13d arranged at each predetermined interval along the circumferential direction of the boss part 13. In this way, strength around the boss part 13 is improved. Particularly, since the rib parts 13d are arranged at each predetermined interval along the circumferential direction of the boss part 13, the spaces 20 formed between the rib parts 13d adjacent in this circumferential direction can be utilized as parts of the gas discharge port 15.

Further, in the high-pressure gas container 100 of the present embodiment, the outer layer 12 is formed to partially cover the upper surface areas of the rib parts 13d. In this way, by extending the outer layer 12 fulfilling a function of reinforcing the inner layer liner 11 to partially cover the upper surface areas of the rib parts 13d, this reinforcing function can be more suitably exhibited.

Furthermore, even if the outer layer 12 is formed to partially cover the upper surface areas of the rib parts 13d as just described, the aforementioned spaces 20 formed between the rib parts 13d are ensured without being closed (see FIG. 8A). Thus, gas discharge ability in the gas discharge port 15 can also be maintained without being impaired while the reinforcing function of the inner layer liner 11 is improved as described above.

It should be noted that a case of covering the upper surface areas of the rib parts 13d by the outer layer 12 is described in the present embodiment. However, the edge part of the open part 12a of the outer layer 12, the end part 11d of the inner layer liner 11 on the side of the boss part and the end part 14d of the gas ventilation part 14 on the side of the boss part may be, for example, formed to be flush with each other so that the outer layer 12 does not cover the upper surface areas of the rib parts 13d at all. In this way, the number of windings of the carbon fiber constituting the outer layer 12 can be reduced.

In this case, since the clearance between the edge part of the open part 12a of the outer layer 12 and the boss outer peripheral surface 13a becomes larger, an area of the gas discharge port 15 increases as a result. Thus, it is preferable to increase a thickness and a length in an axial direction (X-axis direction) of the thick part 13e of the boss part 13 described above. In this way, the aforementioned venturi effect can be suitably exhibited by making an area enclosed by the edge part of the open part 12a, the boss outer peripheral surface 13a and the thick part 13e smaller and a gas discharge function can be ensured without being impaired even if the area of the gas discharge port 15 itself increases.

It should be noted that although a case where eight rib parts 13d are arranged is illustrated and described in the present embodiment, the number of the rib parts 13d is not limited to eight and can be appropriately adjusted in consideration of levels of the gas discharge performance in the gas discharge port 15 and the reinforcing function by the rib parts 13d. Further, it is also possible to adjust a width of the rib parts 13d.

Although the first to seventh embodiments of the present invention have been described above, the above embodiments are merely an illustration of some application examples of the present invention and not intended to limit the technical scope of the present invention to the specific configurations of the above embodiments. For example, although a container configured to store the hydrogen gas and to be installed in the fuel cell vehicle is supposed as the high-pressure gas container 100 in the above embodiments, there is no limitation to this and the configuration of the present invention may be applied to high-pressure gas containers for storing other types of gases and high-pressure gas containers used in applications other than fuel cell vehicles.

Further, the configuration of the gas ventilation part 14 is not limited to those of the above first to seventh embodiments. For example, the gas ventilation part 14 may be configured by projections provided at each predetermined interval on the outer peripheral surface 11c of the inner layer liner 11. In this case, the gas ventilation function is ensured by clearances between adjacent ones of the projections while the tension of the outer layer 12 is maintained by these projections. Furthermore, the inner layer liner 11 may be molded to integrally include the above projections.

Further, the elements of the above first to seventh embodiments can be arbitrarily combined within a range that can be assumed by those skilled in the art.

The invention claimed is:

1. A high-pressure gas container with an inner layer configured such that high-pressure gas is filled inside, a boss part provided at least at one position of the inner layer and configured to cause the gas to flow in and out, and an outer layer configured to cover an outer periphery of the inner layer to reinforce the inner layer and having a higher gas barrier property than the inner layer, wherein:
  a gas discharge port is provided between the boss part and the outer layer and a gas ventilation part is formed between the inner layer and the outer layer such that the gas having permeated from the inner layer to the outer layer is discharged into atmosphere through the gas discharge port;
  the outer layer is formed of a fiber material impregnated with resin; and
  the gas ventilation part is configured as a porous body formed of a fiber material not impregnated with resin, the fiber material of the gas ventilation part being the same type of fiber material as the fiber material forming the outer layer,
  wherein a winding density of the fiber material of the gas ventilation part is lower than a winding density of the fiber material of the outer layer.

2. The high-pressure gas container according to claim 1, wherein:

the gas discharge port is configured by winding a fiber material constituting the outer layer such that an open part having a larger diameter than an outer diameter of the boss part is formed at least on one end part of the outer layer.

3. The high-pressure gas container according to claim 1, wherein:
the porous body is formed by winding a fiber material on the inner layer at a winding density lower than that of a fiber material constituting the outer layer.

4. The high-pressure gas container according to claim 1, wherein:
the boss part is formed with rib parts at each predetermined interval in a circumferential direction of the boss part; and
spaces between the rib parts adjacent in the circumferential direction form parts of the gas discharge port.

5. The high-pressure gas container according to claim 4, wherein:
the outer layer is formed to partially cover upper surface areas of the rib parts.

6. A high-pressure gas container with an inner layer configured such that high-pressure gas is fillable inside, at least one boss part provided at the inner layer, the at least one boss part being configured to cause the gas to flow in and out, and an outer layer configured to cover an outer periphery of the inner layer to reinforce the inner layer and having a higher gas barrier property than the inner layer, wherein:
a gas discharge port is provided between the at least one boss part and the outer layer, and a gas ventilation part is formed between the inner layer and the outer layer such that the gas having permeated from the inner layer to the outer layer is discharged into atmosphere through the gas discharge port;
the outer layer is formed of a fiber material impregnated with resin, wherein each of a first end of the outer layer and a second end of the outer layer is provided with an open part having an edge portion;
the gas ventilation part is configured as a porous body formed of a fiber material not impregnated with resin, the fiber material of the gas ventilation part being the same type of fiber material as the fiber material forming the outer layer,
the at least one boss part is formed at least at an end portion of the inner layer in a longitudinal direction,
the end portion of the inner layer is substantially perpendicular to an outer peripheral surface of the at least one boss part, and
a space is formed between the outer peripheral surface of the at least one boss part and the edge portion of the open part.

7. The high-pressure gas container according to claim 6, wherein the fiber material of the gas ventilation part is the same as the fiber material forming the outer layer.

* * * * *